May 13, 1930.  A. L. BETTS ET AL  1,758,645

TANK VALVE

Original Filed Sept. 3, 1926

Arthur L. Betts and
Paul S. Shield
INVENTORS

BY _____
their ATTORNEY

Patented May 13, 1930

1,758,645

UNITED STATES PATENT OFFICE

ARTHUR L. BETTS AND PAUL S. SHIELD, OF CINCINNATI, OHIO; MARY T. BETTS ADMINISTRATRIX OF SAID ARTHUR L. BETTS, DECEASED; SAID MARY T. BETTS ASSIGNOR, BY DIRECT AND MESNE ASSIGNMENTS, TO AUGUSTINE DAVIS, JR., OF CINCINNATI, OHIO

TANK VALVE

Original application filed September 3, 1926, Serial No. 133,324. Divided and this application filed June 16, 1928. Serial No. 285,816.

This application is a division of our application for patent on tank valve, Serial No. 133,324, filed September 3, 1926.

The invention relates to tank valves such as the safety bottom outlet valves of truck tanks. The general object of the invention is to provide an improved valve and outlet structure for such purposes. The invention comprises certain matters of construction and relation and certain combinations and sub-combinations of parts, which will be described hereinafter and more particularly pointed out in the claims.

The valve herein disclosed embodies certain features which are claimed generically in the Paul S. Shield Patent No. 1,693,257, dated November 27, 1928.

Figure 1:
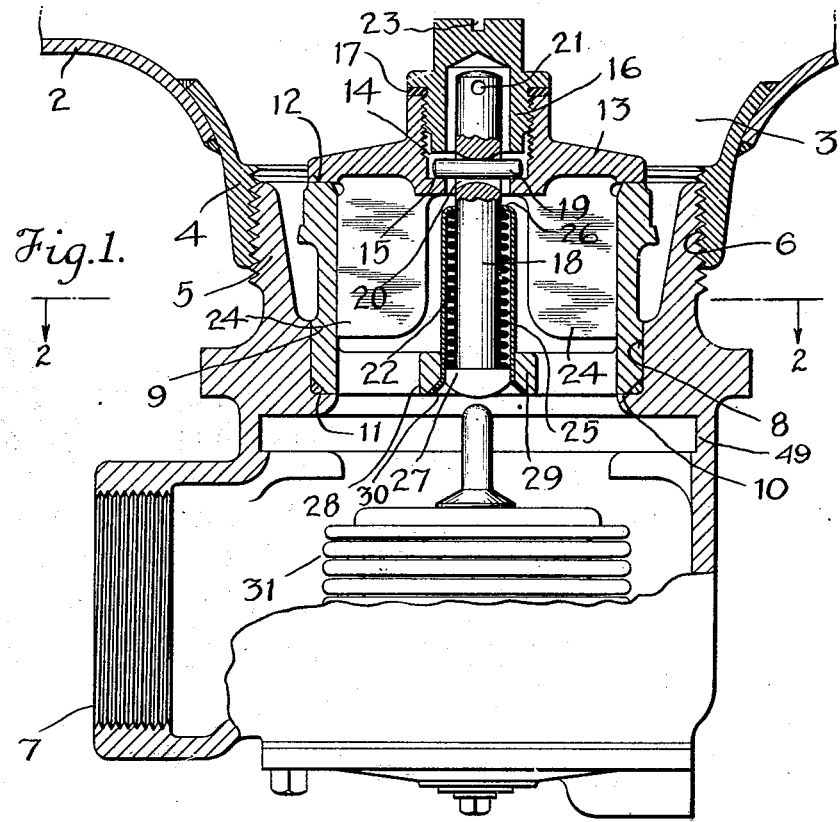
Figure 2:
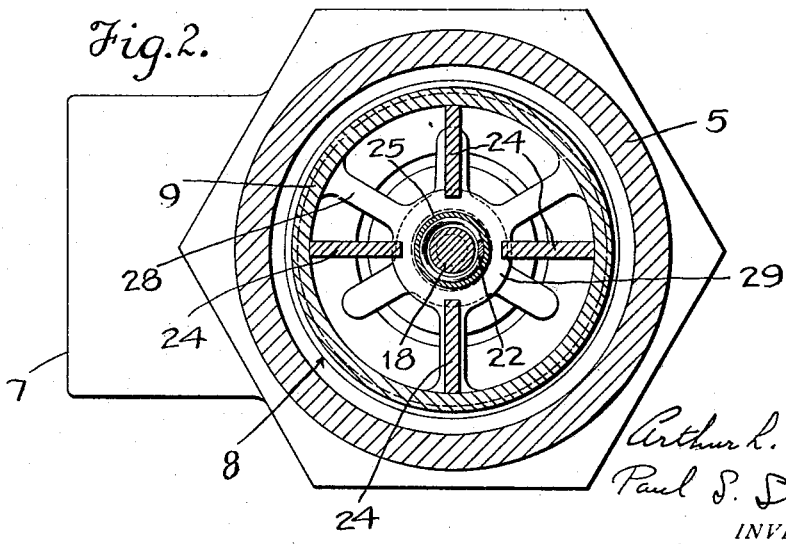

In the accompanying drawings forming part hereof:

Fig. 1 is a central vertical section of the valve and a portion of the tank; and Fig. 2 is a horizontal section.

The numeral 2 designates the bottom sheet of a tank, having a downwardly flanged outlet opening 3, into which is welded a screw-threaded outlet collar 4.

The valve body 5 has screw-threads 6 upon its upper cylindrical portion so that it may be screwed into and removed from this collar from below, that is to say, from the outside of the tank.

The lower part of this body has a lateral outlet connection 7 to receive the delivery pipe; and the interior of this part of the body is utilized as a mechanism chamber for the means hereinafter described for opening the valve.

The upper part of the valve body is formed with an internal cylindrical surface 8, into which is tightly driven a wide annular member 9, preferably of a material such as bronze. The lower end of this member is driven down to a shoulder 10, and impervious material is confined in a recess 11 substantially as in the patent of Paul S. Shield, No. 1,693,257. As in that patent the region 8 where the annular member 9 is held is offset below the zone of possible distortion which includes the screw joint between the body and said member, and from this region the member rises free from the body, carrying the valve seat 12 on the top of its free portion. As was explained in that patent, it was discovered that frequently the reason why such valves tended to leak was not due to any imperfection in the valve itself, but to distortion of the outlet collar resulting from the welding operation, which distortion would distort the valve body, when it was screwed in, sufficiently to impair the tight seating of the valve member against the large internal diameter valve seat of these valves. The advantage of a valve seat which may be made of special material and which is unaffected by any distortion of the valve body due to its securement in the tank outlet is preserved in the present construction; but the valve seat instead of being sunk below the zone of the screw joint, as illustrated in the Shield patent, is considerably elevated on the free portion of the annular member, which extends upward within the said zone, though free from it, so that the valve seat may be substantially at the top of the body without suffering from the effect of distortion in the body. This allows ample room below the valve seat and the valve disk or member 13, both for the operating means for raising and unseating the valve and for the spring means for seating the same, leaving no mechanism within the tank above the valve and valve seat, and requiring no increase over ordinary moderate depth of body below the tank.

The valve member 13 is a disk having an accurately formed flat under surface to bear tight against the accurately formed narrow annular valve seat. The valve disk has a central opening 14 through it, this opening having a shoulder or reduction 15 at the bottom. The opening is screw-threaded to receive a removable plug or closure member 16, which is screwed in from above, a gasket 17 being provided to insure a tight joint.

A depending valve-stem 18 has its upper portion loosely received in the recess formed between the valve disk and its top member 16, and within the hollow interior of the latter. A removable cross-pin 19 passed through a transverse hole 20 in the upper part of the stem, with its ends in the recess of the valve member and confined between the plug 16 and the shoulder 15, provides a simple, disconnectible universal articulation. For this purpose the hole 20 is flared in both directions from the middle, so that the stem may have rocking movement lengthwise of the pin, in addition to the pivotal movement transversely of the pin.

The ends of the pin are opposed by the sides of the recess, so that the pin can not come out as long as the pin is in the recess. The upper end of the stem, however, is provided with a hole 21 whereby, when the plug 16 is removed, the valve stem can be hooked and pulled up against the tension of spring 22 sufficiently to enable the pin to be slipped out. The valve disk is then free and can be taken out for grinding or replacement. In this connection, it will be noted that a kerf 23 is provided in the top of the plug. After removal, the plug is screwed back into the disk, and the plug with its kerf will then serve as a means of engagement for a screw-driver or other tool for the purpose of the valve-grinding operation. The replacement of the valve member is accomplished in a like simple manner.

The valve disk is guided and centered by wings 24 on its under side, the outer vertical edges of these wings cooperating with the cylindrical inner surface of the annular member 9. A space is left at the center, inside of these wings for the valve stem 18, the coil spring 22, and an upstanding sleeve 25 which surrounds the spring and stem, and the upper end 26 of which is turned in to form an abutment, the spring being confined under compression between this abutment and a shouldered head 27 on the lower end of the stem so as to draw the valve down against its seat.

The abutment member 25 is supported from the same annular member that carries the valve seat, that is to say it is supported in the upper part of the body. For this purpose the lower end of the member 9 is formed or provided with a spider 28, the sleeve 25 being inserted upward with a drive fit in the hub 29 of the spider, where it is reliably held against loosening under the action of the spring by means of a flange 30.

The valve is preferably opened by a fluid-pressure operated device 31 disposed in the lower part of the valve body.

It will be seen that the valve member, its seat, and the spring means for closing the valve with its spring abutment, are all carried by the upper part of the body, which is firmly secured to the outlet of the tank. Furthermore, the body is intentionally provided with a comparatively weak section 49 intermediate these parts, the valve and valve closing means being supported by the portion of the body above this section, while the bellows device is carried by the portion of the body below said section. In this way an important protection is obtained, since in case of a collision or other serious accident to the tank vehicle which would be likely to tear away piping and connections, the body, if it breaks at all, will give way at the weakened section, leaving the valve, valve seat and valve-closing means intact and tightly closed.

While the preferred and now best known form of the invention has been described in detail, it will be understood that the invention is not limited to the precise construction, that there may be various changes, additions and omissions within the scope of the claims, and that certain features may be used without others.

We claim:

1. In a tank having a bottom outlet, a valve for closing said outlet comprising a body applied thereto and comprising a portion which is secured to said outlet and a lower portion which affords an external pipe connection, the body being formed intermediate said portions with a relatively weak section adapted to break in case of an accident likely to tear away the piping, a downwardly seating, automatically closing valve member, and an internal annulus which is centered by a tight peripheral fit in the wall of the valve body at a region which is offset from the zone of possible distortion resulting from the securement of the valve body to the tank outlet and which is above said relatively weak section, the annulus rising from said region free from the wall of the body and carrying the seat for said valve member on its free portion.

2. In a tank having a bottom outlet, a valve for closing said outlet comprising a body applied thereto and comprising a portion which is secured to said outlet and a lower portion which affords an external pipe connection, the body being formed intermediate said portions with a relatively weak section adapted to break in case of an accident likely to tear away the piping, a downwardly seating, automatically closing valve member, an internal annulus which is centered by a tight peripheral fit in the wall of the valve body at a region which is offset from the zone of possible distortion resulting from the securement of the valve body to the tank outlet and which is above said relatively weak section, the annulus rising from said region free from the wall of the body and carrying the seat for said valve member on its free portion, and spring means for closing the valve upon the seat likewise carried by the portion of the valve body which is above said weak section.

3. In a tank having a bottom outlet, a valve body secured in said outlet, an annular member set into said valve body and carrying a valve seat, a downwardly seating valve member, guiding wings on the under side of the valve member guiding the same in said annular member, a stem depending from the valve member within said wings, a support carried by said annular member below the wings, a spring abutment rising from said support within the wings, and an expansion spring acting between said abutment and stem for pressing the valve member down against the seat.

4. In a tank having a bottom outlet, a valve body secured in said outlet and provided with an upwardly facing valve seat, a downwardly seating valve member having a central opening and a piece closing said opening from above, the construction affording a recess between the valve member and its closure piece, a stem depending from the valve member, a spring beneath the valve member acting downwardly upon said stem, and means of universal articulation between the upper part of the valve stem and said recess.

5. A tank outlet valve comprising a valve disk or like member having a central opening provided with a shoulder and a piece closing said opening above, a depending valve stem having a transverse hole, and a universal articulation between said stem and the valve member comprising a cross-pin in said hole having its ends confined between said piece and said shoulder.

6. A tank outlet valve comprising a valve disk or like member having a central recess, a removable top plug closing said recess at the upper side, a valve stem depending from the recess and having a transverse hole in its upper portion, and a connection comprising a cross-pin removable from said hole and having its ends in said recess.

7. A tank outlet valve comprising a valve disk or like member having a central recess, a removable top plug closing said recess at the upper side, a valve stem depending from the recess and having a transverse hole in its upper portion, a spring acting downwardly on said valve stem, and a connection comprising a cross-pin removable from said hole and having its ends in said recess, the upper end of the stem having means for engagement by an implement so that it may be lifted against the action of said spring when said plug is removed, in order to permit removal of said cross-pin.

8. A tank outlet valve comprising a valve disk or like member having a central recess, a removable top plug closing said recess at the upper side, a valve stem depending from the recess and having a transverse hole in its upper portion, a spring acting downwardly on said valve stem, and a connection comprising a cross-pin having its middle portion in said hole and its ends in said recess, said pin being removable from the hole in the stem on removing said plug and lifting the stem, and said plug being formed with means for engagement by a tool for a valve grinding operation.

9. In a tank having a bottom opening and an internally screw-threaded collar welded in said opening, a valve body the upper portion of whose wall is externally threaded so as to be screwed upward into said collar, said body having a socket disposed much below the zone of screw engagement between said body and said collar, a tall and wide annulus the lower end of which is fitted tightly in said socket and which thence rises free from the wall of the body, said annulus extending upward within said zone and having a valve seat at the top, and an automatically closed valve member coacting with said seat.

10. In a tank having a bottom outlet, a valve body secured in said outlet, an annular member set into said valve body and carrying a valve seat, a downwardly seating valve member, guiding wings on the under side of the valve member guiding the same in said annular member, a stem depending from the valve member within said wings, a spider carried by said annular member below said wings, a central sleeve set into said spider extending upward around said stem and carrying a spring abutment, and an expansion spring between said sleeve and stem and reacting between the stem and said abutment to press the valve down upon its seat.

ARTHUR L. BETTS.
PAUL S. SHIELD.

CERTIFICATE OF CORRECTION.

Patent No. 1,758,645.     Granted May 13, 1930, to

ARTHUR L. BETTS and PAUL S. SHIELD.

It is hereby certified that the above numbered patent was erroneously issued to "Mary T. Betts, administratrix of Arthur L. Betts, deceased; said Mary T. Betts assignor by direct and mesne assignments, to Augustine Davis, Jr., of Cincinnati, Ohio", whereas said patent should have been issued to "Augustine Davis, Jr., of Cincinnati, Ohio, as assignee of Mary T. Betts, administratrix, and Paul S. Shield, as shown by the records of assignments in this office; and that the said Letters Patent should be read with this correction therein that the same may conform to the record of the case in the Patent Office.

Signed and sealed this 24th day of June, A. D. 1930.

(Seal)
M. J. Moore,
Acting Commissioner of Patents.